(12) United States Patent
Weber et al.

(10) Patent No.: US 12,354,165 B2
(45) Date of Patent: *Jul. 8, 2025

(54) SYSTEMS AND METHODS FOR USING SECONDARY MARKET FOR PRIMARY CREATION AND REDEMPTION ACTIVITY IN SECURITIES

(71) Applicant: NYSE Group, Inc., New York, NY (US)

(72) Inventors: Clifford Weber, Basking Ridge, NJ (US); Thomas Champion, Montrose, NY (US); Laura V. Morrison, New York, NY (US)

(73) Assignee: NYSE Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/954,656

(22) Filed: Nov. 21, 2024

(65) Prior Publication Data

US 2025/0086716 A1    Mar. 13, 2025

Related U.S. Application Data

(63) Continuation of application No. 18/660,917, filed on May 10, 2024, now Pat. No. 12,182,868, which is a
(Continued)

(51) Int. Cl.
*G06Q 40/04* (2012.01)
(52) U.S. Cl.
CPC .................................. *G06Q 40/04* (2013.01)

(58) Field of Classification Search
CPC ......... G06Q 40/04; G06Q 40/00; G06Q 40/06
See application file for complete search history.

(56) References Cited

U.S. PATENT DOCUMENTS 7,430,533 B1 * 9/2008 Cushing ................. G06Q 40/04
705/37
7,873,555 B1 * 1/2011 Kraemer ................. G06Q 40/04
705/37
(Continued)

OTHER PUBLICATIONS

Investopedia, "Internalization Definition," http:www.investopedia.com/terms/internalization.asp, Aug. 11, 2016.

*Primary Examiner* — Hao Fu
(74) *Attorney, Agent, or Firm* — DLA Piper LLP (US)

(57) ABSTRACT

Systems and methods for transforming an electronic portfolio. A system includes an electronic crossing platform that receives data defining trade orders of the electronic portfolio during an initial time period; compares portions of the data to determine an imbalance of the trade orders remaining after the initial time period and receives, during a final time period, a final trade order from a fund agent device to offset the remaining imbalance. The platform receives, after the final time period, a benchmark value of the electronic portfolio from a fund device; compares the final trade order with the remaining imbalance to determine an adjustment value; converts the benchmark value to a final value by applying the adjustment value to the benchmark value; and transforms the electronic portfolio into the transformed portfolio by creating paired buy and sell orders among the trade orders received during the initial time period at the final value.

18 Claims, 9 Drawing Sheets

Related U.S. Application Data continuation of application No. 18/505,511, filed on Nov. 9, 2023, now Pat. No. 12,026,777, which is a continuation of application No. 18/128,121, filed on Mar. 29, 2023, now Pat. No. 11,854,081, which is a continuation of application No. 17/882,918, filed on Aug. 8, 2022, now Pat. No. 11,651,431, which is a continuation of application No. 17/527,671, filed on Nov. 16, 2021, now Pat. No. 11,449,940, which is a continuation of application No. 16/671,394, filed on Nov. 1, 2019, now Pat. No. 11,210,738, which is a continuation of application No. 14/804,506, filed on Jul. 21, 2015, now Pat. No. 10,504,177.

(60) Provisional application No. 62/028,447, filed on Jul. 24, 2014.

(56) References Cited

U.S. PATENT DOCUMENTS

| | | | |
|---|---|---|---|
| 8,306,901 B1 | 11/2012 | Gastineau et al. | |
| 2002/0019795 A1 | 2/2002 | Madoff et al. | |
| 2005/0283421 A1 | 12/2005 | Hatheway et al. | |
| 2006/0218075 A1 | 9/2006 | Feldman et al. | |
| 2010/0174664 A1* | 7/2010 | Kelly | G06Q 40/00 705/37 |
| 2015/0262299 A1* | 9/2015 | Crowley | G06Q 40/04 705/37 |

* cited by examiner

SYSTEMS AND METHODS FOR USING SECONDARY MARKET FOR PRIMARY CREATION AND REDEMPTION ACTIVITY IN SECURITIES

TECHNICAL FIELD

The present disclosure relates generally to systems and methods for trading financial products and, in particular, creating and redeeming non-creation unit aggregation of shares of securities, including (without limitation) actively managed exchange-traded funds, index based and/or passively managed exchange traded funds.

BACKGROUND

Existing electronic trading systems very often have a problem of efficiently processing electronic portfolios of financial products. The inefficiencies may be caused, for example, by imbalances of buy to sell orders within the electronic portfolios. As a result of these imbalances, large numbers of transactions are needed to fully process and fulfil all of the orders within the portfolios, thereby unnecessarily consuming the computer resources of the electronic trading systems. This problem is exasperated with large electronic portfolios and/or electronic portfolios having large imbalances. Moreover, existing electronic trading systems do not have the ability to quickly identify such imbalances, prevent the imbalances from increasing, and/or take steps to reduce and/or cure the imbalances in a manner that reduces the drain on computer resources of electronic trading systems (e.g., by reducing the number of orders that need to be processed) and/or that increases their operating efficiency. Accordingly, there is a need for systems and methods to address these and other related problems.

SUMMARY

Aspects of the present disclosure relate to systems, methods and non-transitory computer-readable storage media for transforming an electronic portfolio of data. An electronic crossing platform receives, during an initial time period, data defining one or more trade orders of the electronic portfolio to be transformed. A processor of the electronic crossing platform compares a portion of the data to another portion of the data to determine an imbalance of the one or more trade orders remaining after the initial time period. The electronic crossing platform receives, during a final time period, further data defining a final trade order to offset the imbalance remaining after the initial time period. The final trade order is received from a fund agent computing device in electronic communication with the electronic crossing platform. The electronic crossing platform receives, after the final time period, a benchmark value of the electronic portfolio from a fund computing device in electronic communication with the electronic crossing platform. The processor of the electronic crossing platform compares the further data defining the final trade order with the imbalance remaining after the initial time period to determine an adjustment value; converts the benchmark value to a final value by applying the adjustment value to the benchmark value; and transforms the electronic portfolio into the transformed portfolio by creating paired buy and sell orders from among the data defining the one or more trade orders received during the initial time period at the final value.

DETAILED DESCRIPTION

Figure 1:
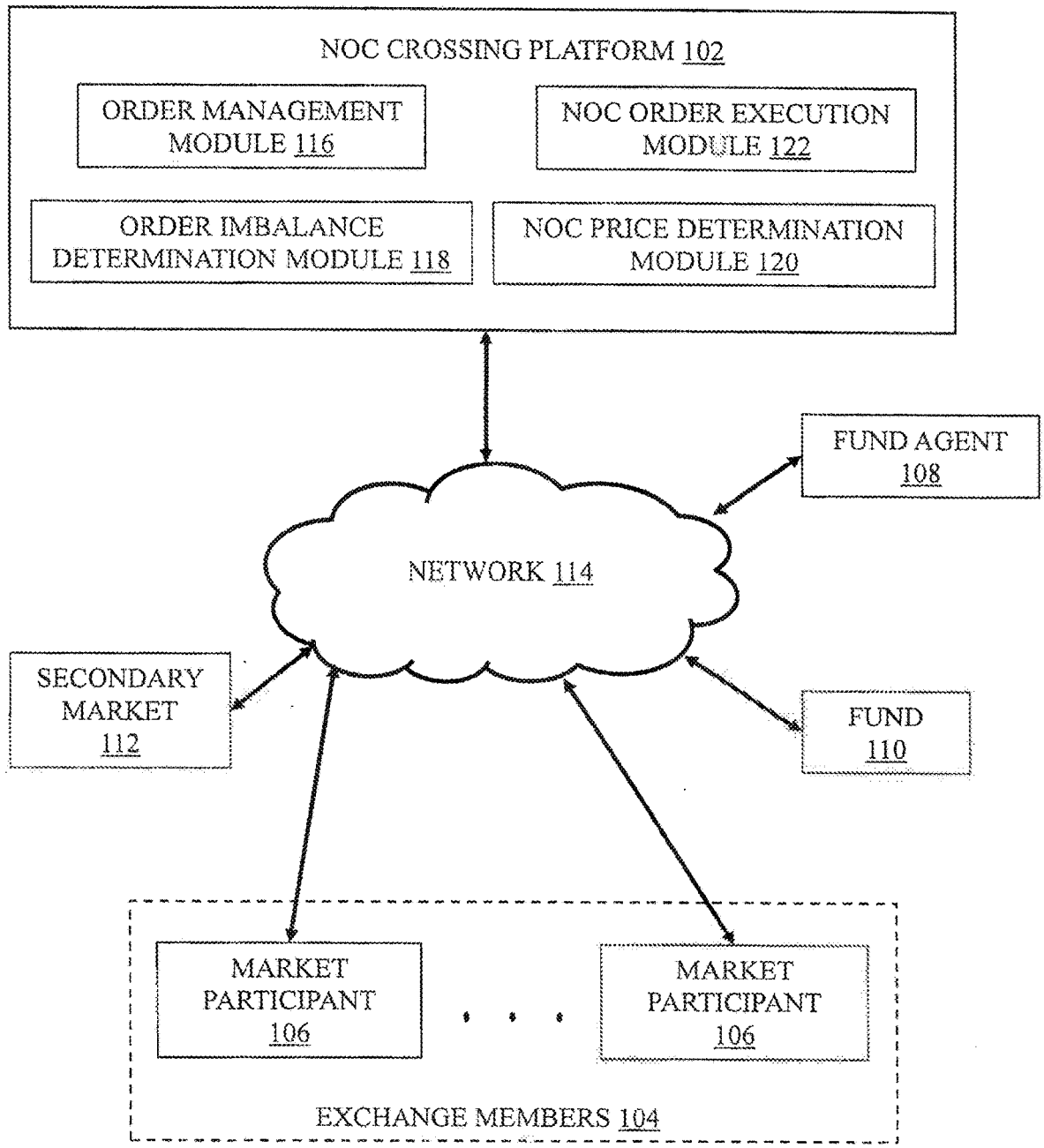
FIG. 1 is a functional block diagram of an example electronic trading system for transforming an electronic portfolio of data, according to an aspect of the present disclosure.

An exchange traded fund (ETF) is an investment fund traded like a common stock on a stock exchange. An ETF holds assets such as stocks, commodities, or bonds, and may trade close to its net asset value (NAV) over the course of a trading day. ETFs may, for example, track an index, a commodity, bonds or a basket of assets. The supply of ETF shares may be regulated through a creation and redemption mechanism.

ETFs that trade in the United States may provide daily creation and redemption portfolios that essentially provide full transparency into the ETF's holdings, which allows for a relatively straightforward determination of the underlying fair value of the ETFs throughout the trading day. Typically, buy and sell orders in the secondary market may be matched at agreed prices throughout the trading day. Daily creation and redemption activity occurs only at a NAV price determined after the order is placed directly with the fund by authorized participants. The combination of intraday transparency and an open-ended ETF creation and redemption process creates an arbitrage mechanism which ensures that small investors who are not able to transact directly with the fund in creation unit aggregations can be confident of being able to transact at a price close to the ETF's underlying fair value at the time of purchase or sale.

Trading actively managed ETFs (AMETFs), however, may not provide full transparency into the fund holdings on a daily basis. While various strategies may be implemented that attempt to ensure pricing close to the AMETF's underlying fair value in the secondary market, small investors may be less certain that they will be able to reliably receive a price that is reasonably close to the underlying fair value, and may find it preferable to transact at a price with a defined relationship to the NAV. Further, the potential desire of investors to explicitly be guaranteed the ability to trade at a price with a defined relationship to the NAV may not be restricted to AMETFs, and may apply as well to index-based, or passively managed, ETFs, fully disclosed actively managed ETFs, other types of exchange-traded products (ETPs) and any security for which the underlying value may be tied to an externally calculated benchmark value such as a NAV.

One solution to allow for trading at prices related to the NAV includes an approach based on trade at settlement (TAS) trading in futures contracts. In an example approach, trades occur throughout the day in a basis to be applied against the futures settlement price at the end of the day, but reference the ETF's NAV rather than the futures settlement price.

Another approach may involve offering trading at a price related to the NAV for listed mutual funds and ETFs.

In any event, attempts to ensure fair pricing often leads to imbalances in the portfolios themselves, thereby causing inefficiencies in the processing and fulfillment of the same. As a result, there present disclosure provides systems and methods for transforming the electronic portfolios into balanced portfolios (so as to reduce computing inefficiencies caused by imbalanced portfolios), while providing fair pricing.

Example systems and methods for transforming an electronic portfolio of data includes an electronic crossing platform that receives data defining trade orders of the electronic portfolio, during a first time period (e.g., during the trading day), from market participants and determines an imbalance of the trade orders remaining after the first time period. The crossing platform also receives, during a final time period (e.g., during the trading day before a market close), data defining a final trade order from a fund agent computing device to offset the imbalance remaining after the initial time period. The crossing platform receives, after the final time period (e.g., after the market close), a benchmark value (e.g., a NAV) of the electronic portfolio, and adjusts the benchmark value to form a final value, based on a comparison of the data defining the final trade order and the imbalance remaining after the initial time period. The electronic platform may transform the electronic portfolio, after the third period (e.g., after the market close), by creating paired buy and sell orders from among the data defining the trade orders received during the initial time period at the final value. The trade orders may include AMETFs, index-based ETFs, passively managed ETFs and/or any suitable security tied to the benchmark value.

The initial time period may include a first time period (e.g., from a market open time to a first cutoff time) and a second time period (e.g., from the first cutoff time to a second cutoff time before the final time period). In the initial time period, the electronic crossing platform may enter all trade orders associated with the electronic portfolio. In the second time period, the electronic crossing platform may only accept offsetting trade orders from market participants that offset the imbalance remaining after the first time period. Entered trade orders from both the first and second time periods may be paired at the final value (after the final time period). The crossing platform may determine a final trade imbalance of the offsetting trades remaining after the second time period. The final trade order that is received may offset the final imbalance remaining after the second time period.

The final trade order may be generated by the fund agent computing device responsive to trading with a secondary market during the final time period, by creation activity or redemption activity to completely offset the trade imbalance remaining after the initial time period (or after the second time period). The creation activity/redemption activity may include creation unit size activity or non-creation unit size activity.

In some examples, the electronic crossing platform may periodically indicate the imbalance remaining among the received trade orders and/or offsetting trade orders to the market participants and fund agent computing device(s). The indicated imbalance may be used, for example, to encourage market participants to submit offsetting trade orders, during the second time period.

Example systems and methods of the present disclosure allow investors to be guaranteed to receive a single price close to the NAV each day when not transacting directly with the fund in creation unit size aggregations, while fostering efficient pricing. Example electronic trading systems and methods: (i) may provide incentives for market participants to provide liquidity to offset possible imbalances; (ii) may concentrate liquidity in a single crossing session once the NAV is determined; and (iii) may provide a mechanism for the fund to potentially offset imbalances through non-creation unit size issuance and redemption of fund shares.

Aspects of the present disclosure relate to systems and methods for buying and selling non-creation unit size aggregations of shares of securities, including (without limit) shares of an AMETF and/or an ETF at or near the NAV with guaranteed execution. The present disclosure also relates to creation and redemption of AMETFs and ETFs (and/or other securities) in other than non-creation unit size aggregations. Notably, the systems and methods described herein are effective for use in connection with all types of financial products (e.g., actively managed ETFs and index based or passively managed ETFs). However, and solely for exemplary and illustrative purposes, aspects of the present disclosure shall be described in the context of AMETFs and ETFs.

In an example embodiment, the present disclosure allows investors to efficiently buy and sell non-creation unit size aggregations of shares of an AMETF or index based ETF at or near the NAV with guaranteed execution. The present disclosure can maximize liquidity for efficient transaction at or near the NAV, including non-creation unit size creation and redemption with a designated third party agent and utilizing a price adjustment convention in determining the transaction price designed to foster liquidity.

FIG. 1 is a functional block diagram illustrating an example electronic trading system 100 (also referred to herein as system 100), according to aspects of the present disclosure. System 100 may include electronic NAV-on-Close (NOC) crossing platform 102, plurality of market participants 106 (collectively referred to herein as exchange members 104), fund agent 108, fund 110 and secondary market 112. NOC crossing platform 102, exchange members 104, fund agent 108, fund 110 and second market 112 may be communicatively coupled via network 114. In one example, each of exchange members 104, fund agent 108, fund 110 and secondary market 112 may be represented by a computing device (such as computer system 800 shown in FIG. 8), including a non-transitory memory storing computer-readable instructions executable by a processing device to perform the functions described herein. Each of exchange members 104 and fund agent 108 may be programmed to access NOC crossing platform 102 via network 114. Network 114 may include, for example, a private network (e.g., a local area network (LAN), a wide area network (WAN), intranet, etc.) and/or a public network (e.g., the Internet).

It should be understood that electronic NOC crossing platform 102 refers to a computing system having sufficient processing and memory capabilities to perform the following functions, and it does not necessarily refer to a specific physical location. In certain embodiments, the computing system may be distributed over several physical locations, connected by one or more wired and/or wireless links. An example computing system that may represent NOC crossing platform 102 is described below with respect to FIG. 8.

Although FIG. 1 illustrates one fund agent 108, one fund 110 and one secondary market 112, it is understood that FIG. 1 represents an example embodiment of system 100, and that other arrangements of these elements are within the scope of the present disclosure. Thus, system 100 may include one or more fund agents 108, one or more funds 110 and one or more secondary markets 112.

NOC crossing platform 110 may be comprised of one or more modules configured to: process trade orders (buy and sell) of an electronic portfolio received from among exchange members 104 and at least one final trade order received from fund agent 108 during different designated time periods for trade order entry; determine and communicate trade order imbalances to the market (i.e., exchange members 104 and fund agent 108) during the trading day; determine an NOC price; and execute the received trade orders from among exchange members 104 according to the NOC price after the market is closed. For example, NOC crossing platform 102 may include order management module 116, order imbalance determination module 118, NOC price determination module 120 and NOC order execution module 122.

In one embodiment, order management module 116 may be configured to manage aspects of entering and/or rejecting received trade order(s)/final trade order(s) from among exchange member 104 and fund agent 108, depending upon the designated time periods for trade order entry (described further below). Order management module 116 may also direct order imbalance determination module 118 to determine an order imbalance at various times during the trading day, and may also control communication of the imbalance to the market.

In one embodiment, order imbalance determination module 118 may be configured to determine a trade order imbalance remaining, at various instances during the trading day, based on the entered trade orders. In one of the designated time period for trade order entry, the determined trade order imbalance may be used by order management module 116 to reject received trade orders from exchange members 104 that do not offset the remaining imbalance.

In one embodiment, NOC price determination module 120 may be configured to determine the NOC price after the market is closed, by adjusting the NAV price associated with the electronic portfolio (determined by fund 110) according to an adjustment value. The adjustment value may be determined based on the final trade order(s) received from fund agent 108 and a final remaining order imbalance determined by order imbalance determination module 118.

In one embodiment, NOC order execution module 122 may be configured to pair buy and sell orders among the entered trade orders from exchange members 104, based on the NOC price determined by NOC price determination module 120, to execute the entered trade orders after the market is closed. In some examples, NOC order execution module 122 may be configured to execute the entered trade orders in a single crossing after the market is closed, according to a single NOC price.

In operation, exchange members 104 may use NOC crossing platform 102, to place, cancel and/or modify NOC orders throughout the trading day, up to a first pre-determined cut-off time (i.e., a first time period). NOC crossing platform 102 may disseminate messages (i.e., communications) to the market, publishing the order imbalance at one or more points throughout the day. The order imbalance may be a buy imbalance (i.e., more buy orders than sell orders) or a sell imbalance (i.e., more sell orders than buy orders).

After the first cut-off time, during a second time period, NOC crossing platform 102 may only accept cancellation and/or modification orders from exchange members 104 which reduce the imbalance, without flipping the imbalance from buy to sell (or sell to buy). At a second cut-off time, in a third time period, NOC crossing platform 102 may no longer accept orders, cancellations and/or modifications from exchange members 104. In the third time period, NOC crossing platform 102 may determine a final imbalance and communicate the final imbalance to the market. Fund agent 108 (e.g., a designated market maker (DMM)) may then provide at least one final trade order to offset the final NOC order imbalance, at a price related to the NAV (once the NAV is determined by fund 110).

After the third time period (after the market is closed), NOC crossing platform 102 may determine the NOC price at which trade orders received from exchange participants 104 (during the first and second time periods) may be executed. The price at which the NOC trades occur may be determined objectively as a function of the order imbalance. If designated fund agent 108 is selling shares to offset the final imbalance, the NOC trade price may be the NAV adjusted upwards based on disclosed rules (e.g., rounded up to the next cent). Conversely, if designated fund agent 108 is buying shares to offset the final imbalance, the NOC trade price may be the NAV adjusted downwards based on disclosed rules (e.g., rounded down to the next cent). The NOC price also may be adjusted to reflect certain costs associated with the creation and redemption of new shares by designated fund agent 108 through direct interaction with fund 110. Designated fund agent 108 may be permitted to transact with fund 110 at the NAV in non-creation unit size aggregations to the extent needed to fill the NOC order imbalance. Because of the pricing convention for the NOC orders, fund agent 108, as well as other investors, may be incented to offset the order imbalance because they may be buying slightly below or selling slightly above the actual NAV. All interactions with fund 110 may continue to take place at the NAV.

Those skilled in the art will appreciate that electronic NOC crossing platform 102 may be configured with more or less modules to conduct the methods described herein with reference to FIGS. 2A-2C, 3B and 4-7. As illustrated in FIGS. 2A-2C, 3B and 4-7, each of the corresponding methods may be performed by processing logic (such as processing logic 804 in FIG. 8) that may comprise hardware (e.g., circuitry, dedicated logic, programmable logic, microcode, etc.), software (such as instructions run on a processing device), or a combination thereof. In one embodiment, the methods shown in 2A-2C, 3B and 4-7 may be performed by one or more processing components associated with modules 116-122 of NOC crossing platform 102.

Although electronic crossing platform 102 is described in examples herein as a NAV-On-Close crossing platform, in general, electronic crossing platform 102 may use any suitable benchmark value, and may execute trade orders on market close for any suitable security tied to the benchmark value. Thus, electronic crossing platform 102 may be more generally considered to be a benchmark-on-close crossing platform. The trade orders may be associated with actively managed ETFs, index based or passively managed ETFs at or near a benchmark value and/or any security for which the underlying value may be tied to the benchmark value.

Figure 2A:
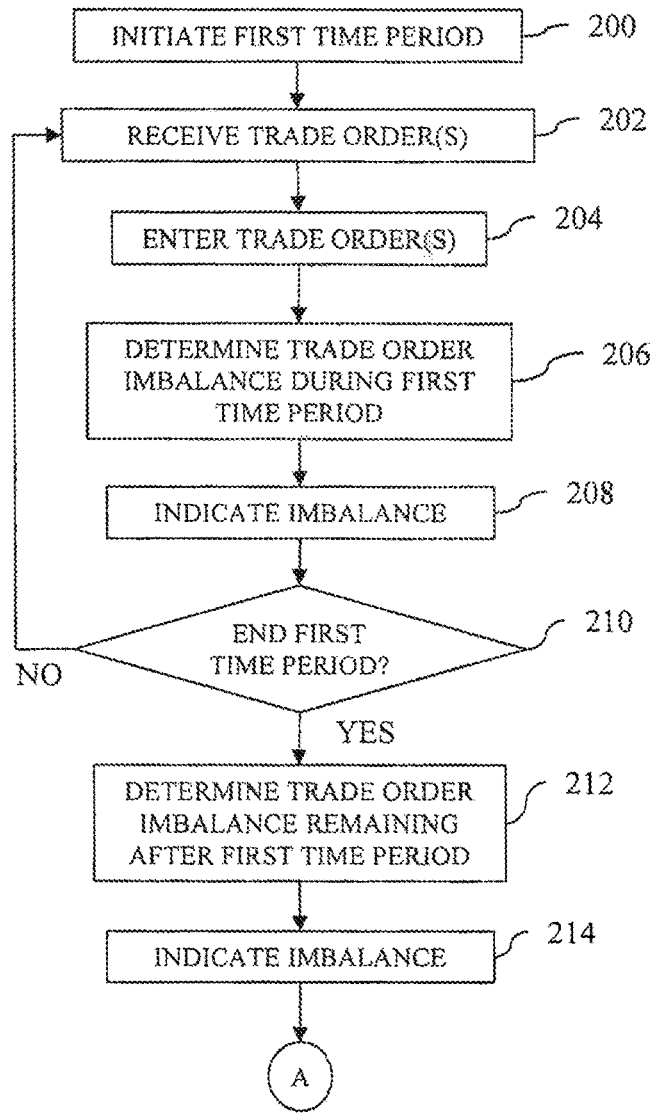
FIGS. 2A, 2B and 2C are flowchart diagrams of an example method of transforming an electronic portfolio of data, according to an aspect of the present disclosure.
Figure 2B:
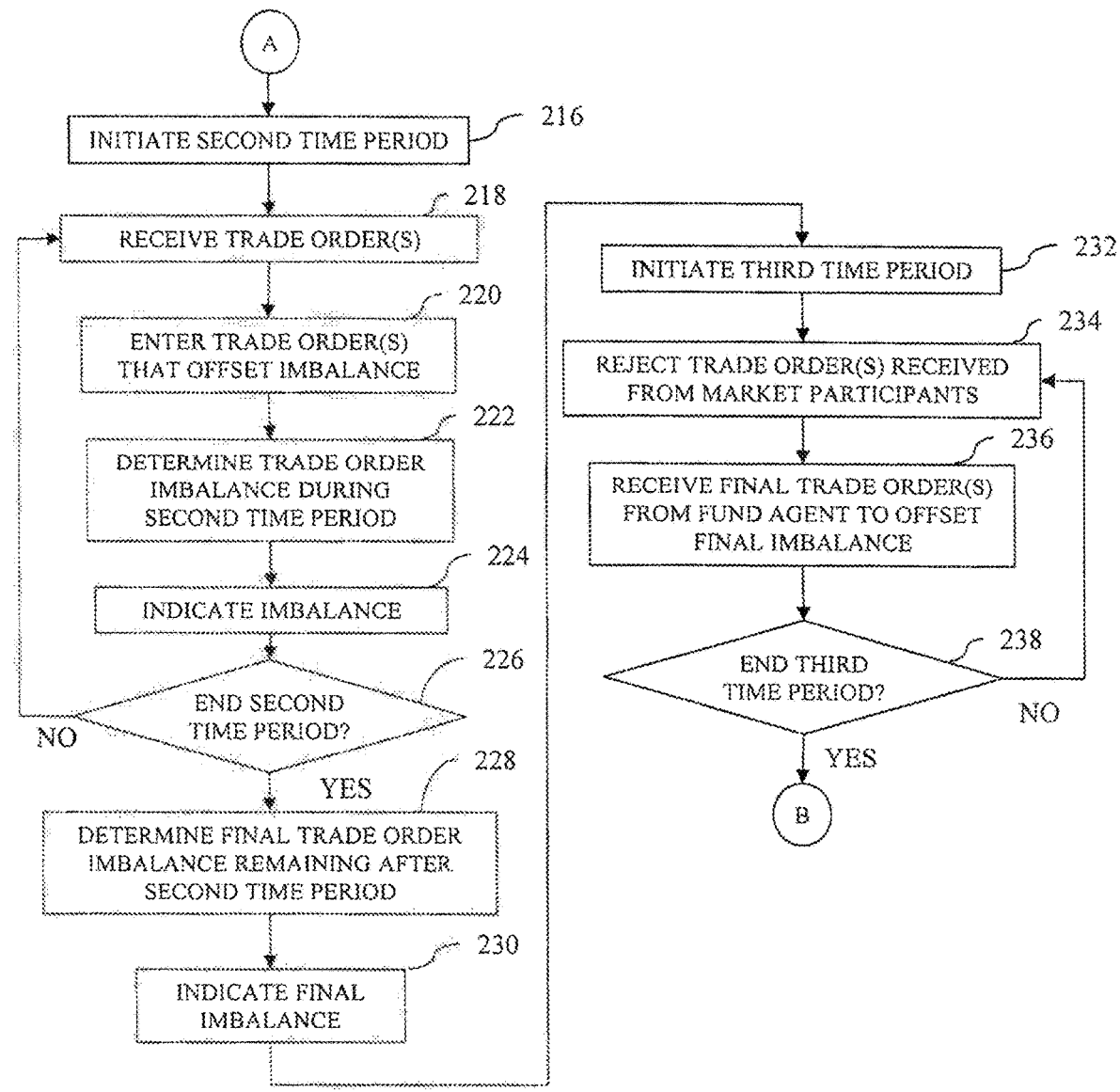
Figure 2C:
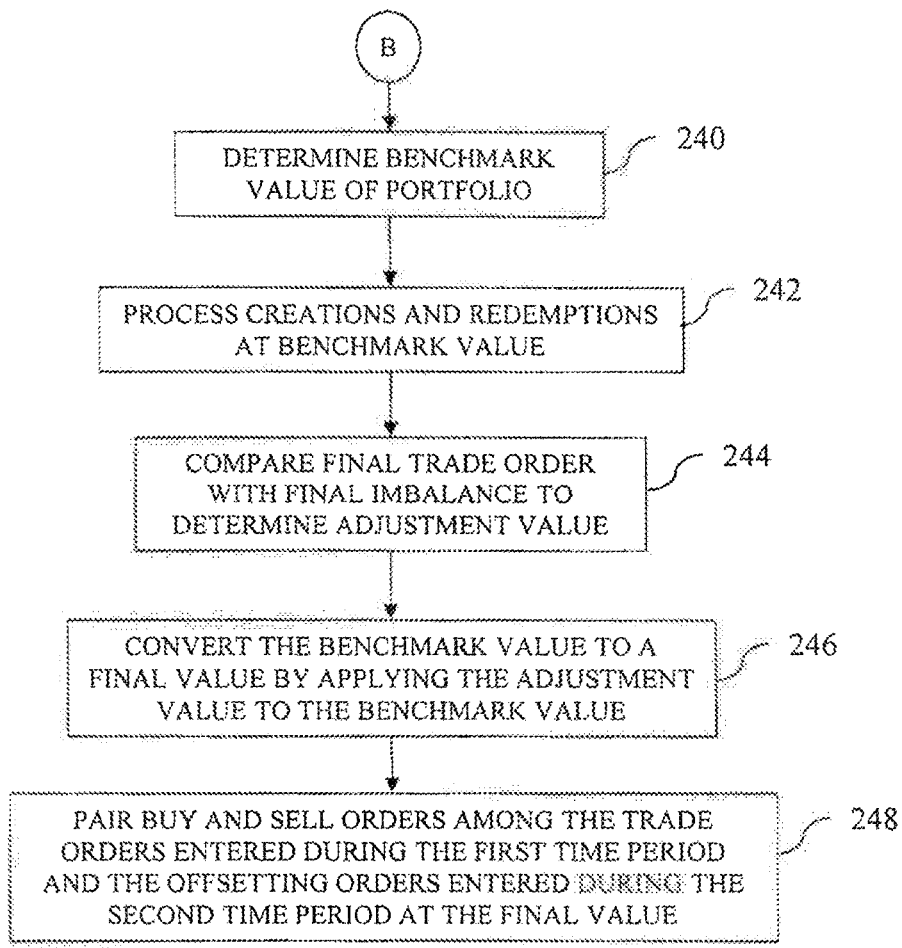

FIGS. 2A-2C illustrate flowchart diagrams of an example method of transforming an electronic portfolio of data, according to an aspect of the present disclosure. FIGS. 2A-2C are described with reference to FIG. 1.

Referring to FIG. 2A, at step 200, a first time period is initiated, for example, by order management module 116 of NOC crossing platform 102. An initial time of the first time period may represent a market open time (i.e., a start of the trading day). At step 202, one or more trade orders are received, for example, by order management module 116, from among exchange members 104. At step 204, order management module 116 may enter the received trade order(s) into NOC crossing platform 102 related to a particular electronic portfolio. In some examples, order management module 116 may enter any buy or sell NOC order, cancellation order or modification order during the first time period.

At step 206, order imbalance determination module 118 of NOC crossing platform 102 may, optionally, determine a trade order imbalance during the first time period, by comparing portions of data among the entered trade orders. At step 208, the imbalance may, optionally, be indicated to the market (i.e., exchange members 104 and fund agent 108), for example, by order management module 116. For example, the order imbalance may be published on an electronic ticker tape or may be transmitted as a message to the market.

At step 210, order management module 116 determines whether the end of the first time period is reached, based on a predetermined first cut-off time. When the end of the first time period is not reached, step 210 proceeds to step 202, and steps 202-210 are repeated.

When the end of the first time period is reached, order imbalance determination module 118 determines, at step 212, a trade order imbalance remaining after the first time period. At step 214, the remaining imbalance after the first time period may be indicated to the market, for example, by order management module 116. Step 214 proceeds to step 216 (FIG. 2B).

Referring to FIG. 2B, at step 216, order management module 116 may initiate a second time period. An initial (start) time of the second time period may commence at or after the predetermined first cutoff time (step 210). At step 218, order management module 116 receives one or more trade orders from among exchange members 104. At step 220, order management module 116 enters offsetting trade orders (i.e., buy or sell NOC orders, cancellation orders or modification orders) that offset the imbalance remaining (step 212 initially or step 222 subsequently), while rejecting other received trade orders from exchange members 104.

At step 222, order imbalance determination module 118 determines a trade order imbalance during the second time period, by comparing data among the entered trade orders (in the first time period) and the entered offsetting trade orders. At step 224, order management module 116 may indicate the imbalance to the market (i.e., exchange members 104 and fund agent 108).

At step 226, order management module 116 determines whether the end of the second time period is reached, based on a predetermined second cut-off time. When the end of the second time period is not reached, step 226 proceeds to step 218, and steps 218-226 are repeated.

When the end of the second time period is reached, order imbalance determination module 118 determines, at step 228, a final trade order imbalance remaining after the second time period. At step 230, order management module 116 may indicate the final trade order imbalance to the market (including to fund agent 108).

Steps 208, 214 and 224 may be used to keep exchange members informed of any trade order imbalance and may be used to incentivize exchange members 104 to submit offsetting trade orders (in the second time period), to reduce a remaining order imbalance.

At step 232, order management module 116 may initiate a third time period. An initial (start) time of the third time period may commence at or after the predetermined second cutoff time (step 226). At step 234, order management module 116 rejects any trade orders from exchange members 104. At step 236, order management module 116 receives and enters at least one final trade order from fund agent 108, responsive to the indicated final imbalance (step 230). The final trade order(s) is generated by fund agent 108 trading in secondary market 112, such that the final trade order(s) offsets the indicted final trade order imbalance (step 230).

At step 238, order management module 116 determines whether the end of the third time period is reached, based on a predetermined third cut-off time (i.e., the market close time). When the end of the third time period is not reached, step 238 proceeds to step 234, and steps 234-238 are repeated.

When the end of the third time period is reached (i.e., at the market close), step 238 proceeds to step 240 (FIG. 2C).

Referring to FIG. 2C, at step 240, a benchmark value (e.g., a NAV) of the electronic portfolio is determined, by fund 110, after the third period (i.e., after the market close). At step 242, fund 110 processes any received creation and redemption orders from authorized participants (such as fund agent 108) at the determined benchmark value (e.g., at the NAV).

At step 244, NOC price determination module 120 of NOC crossing platform 102 compares the final trade order(s) received from fund agent 108 (step 236) with the final imbalance (step 228) to determine an adjustment value. At step 246, NOC price determination module 120 converts the benchmark value (step 240) to a final value (i.e., the NOC price) by applying the adjustment value (step 244) to the benchmark value. Steps 244 and 246 are described further below with respect to FIG. 3B.

At step 248, NOC order execution module 122 of NOC crossing platform 102 pairs buy and sell orders among the trade orders entered during the first time period and the offsetting trade orders entered during the second time period at the final value (the NOC price), to execute the entered NOC orders received from exchange members 104. NOC crossing platform may also indicate the trades to the market and enter the trades into a clearing facility.

Figure 3A:
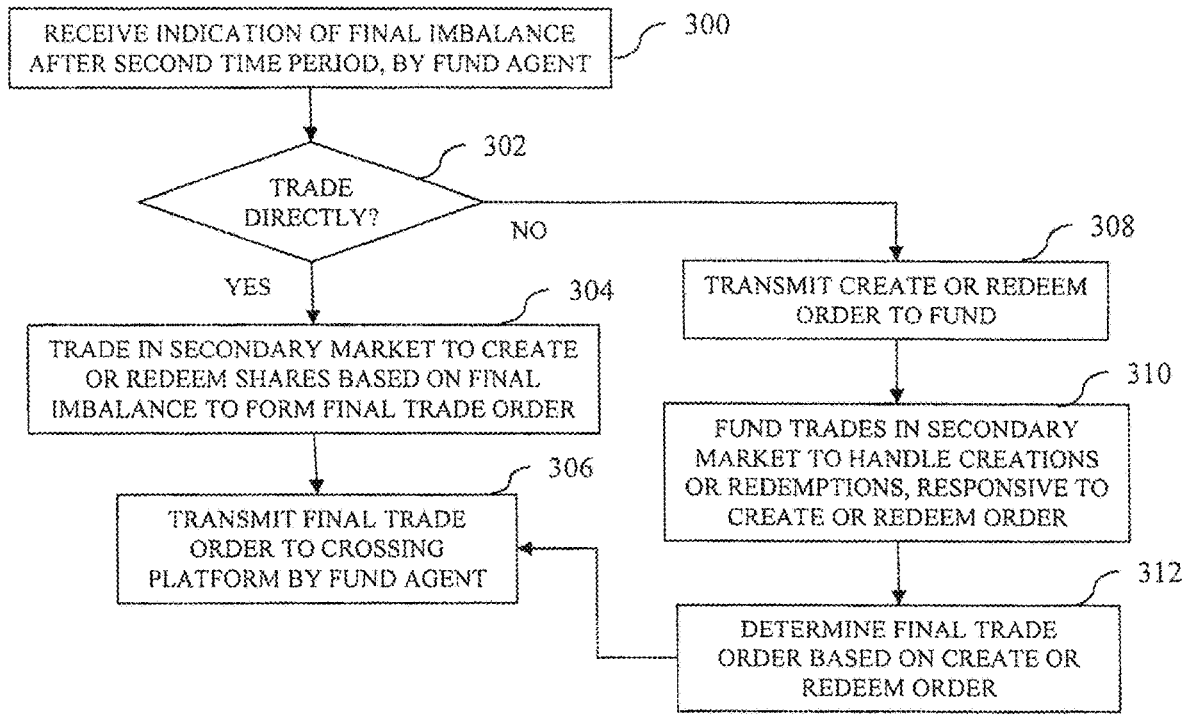
FIG. 3A is a flowchart diagram of an example method of generating a final trade order by a fund agent using a secondary market, according to an aspect of the present disclosure.

FIG. 3A is a flowchart diagram of an example method of generating at least one final trade order by fund agent 108 using secondary market 112, according to an aspect of the present disclosure. The method steps shown in FIG. 3A may occur during the third time period (i.e., after the second time period and before the market close).

At step 300, fund agent 108 receives an indication of the final imbalance remaining (after the second time period), from NOC crossing platform 102 (step 230 in FIG. 2B). At step 302, fund agent 108 determines whether to trade directly with secondary market 112 (e.g., the New York Stock Exchange, NASDAQ, etc.).

When it is determined to trade directly, fund agent 108, at step 304, trades in secondary market 112 to create or redeem shares of the ETF (or security) to offset the final trade order imbalance, to form at least one final trade order. At step 306, fund agent 108 transmits the final trade order(s) to NOC crossing platform 102. The final trade order(s) transmitted by fund agent 108 corresponds to the received final trade order(s) in step 236 (FIG. 2B).

When it is determined to trade indirectly, fund agent 108, at step 308, transmits at least one create or redeem order to fund 110 to offset the final trade order imbalance. Responsive to the create or redeem order(s), fund 110, at step 310, trades in secondary market 112 to handle creations or redemptions. At step 312, fund agent 108 forms the final trade order(s) based on the create or redeem order and/or responsive to an indication from fund 110 regarding the secondary market trading (step 310). Step 312 proceeds to step 306.

Figure 3B:
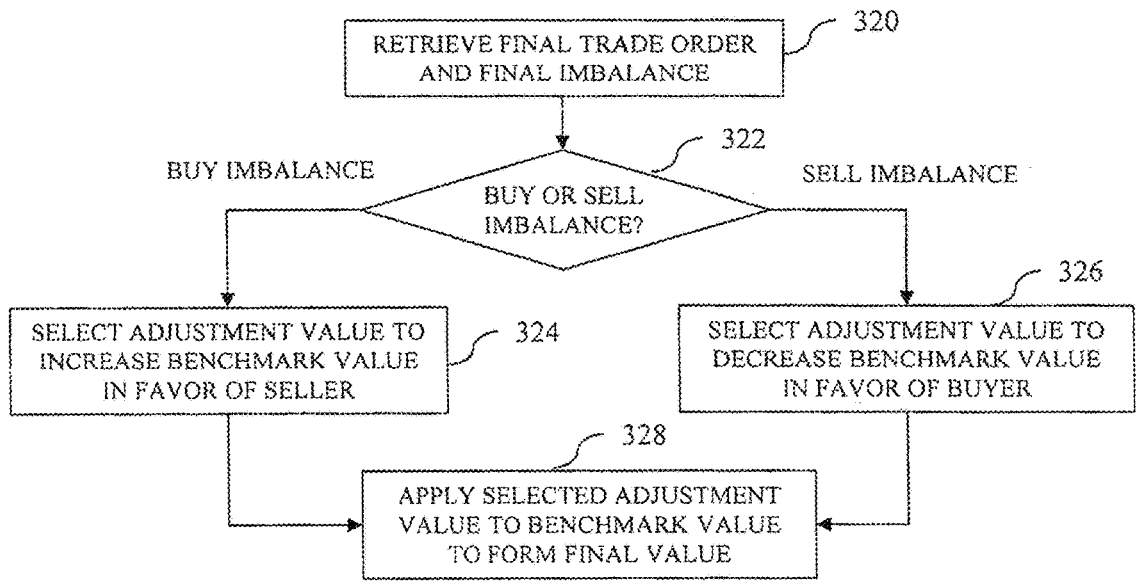
FIG. 3B is a flowchart diagram of an example method of adjusting a benchmark value of an electronic portfolio, according to an aspect of the present disclosure.

FIG. 3B is a flowchart diagram of an example method of adjusting a benchmark value (e.g., NAV) of an electronic portfolio including trade orders (steps 244 and 246 in FIG. 2C), according to an aspect of the present disclosure. The method steps shown in FIG. 3B may be performed by NOC price determination module 120 of NOC crossing platform 102 (FIG. 1).

Figure 8:
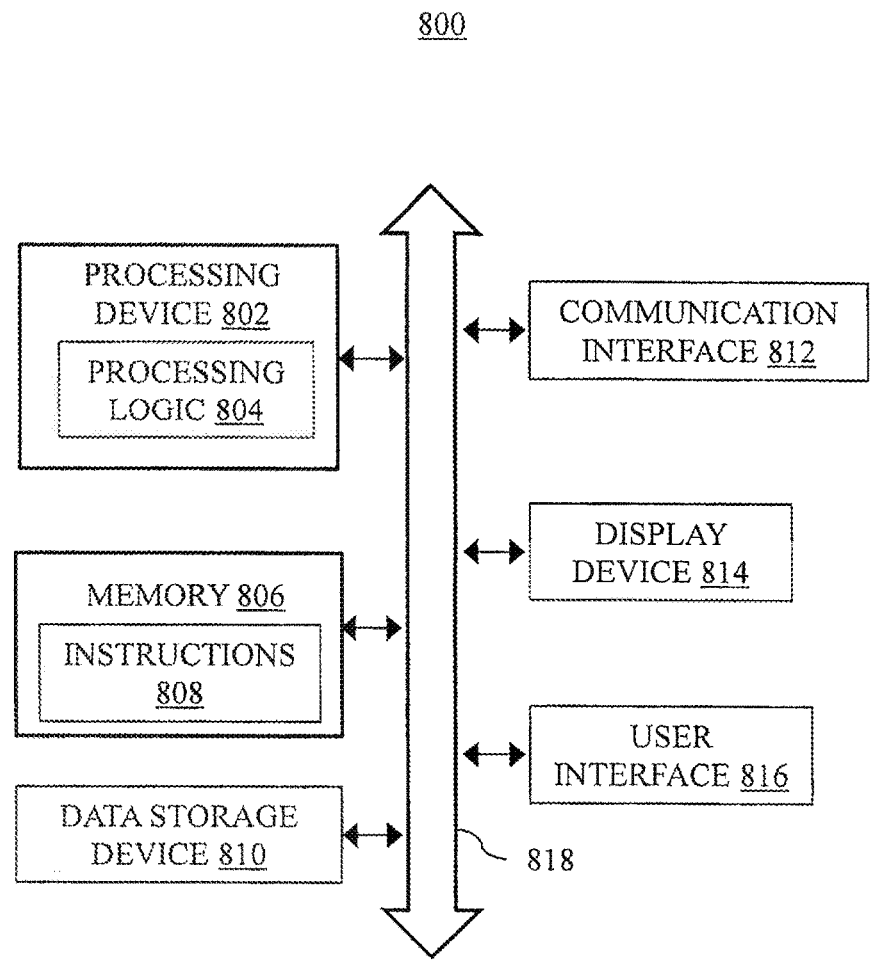
FIG. 8 is a functional block diagram of an example computer system, according to an aspect of the present disclosure.

At step 320, the received final trade order(s) (step 236) and the final trade order imbalance (step 228) are retrieved, for example, from a non-transitory memory (e.g., memory 806 or data storage device 810 shown in FIG. 8). At step 322, it is determined whether there is a buy or sell imbalance, by comparing the final trade order(s) with the remaining final imbalance.

When, at step 322, it is determined that there is a buy imbalance, step 322 proceeds to step 324, and the adjustment value is selected to increase the benchmark value in favor of the seller. When, at step 322, it is determined that there is a sell imbalance, step 322 proceeds to step 326, and the adjustment value is selected to decrease the benchmark value in favor of the buyer.

Steps 324 and 326 proceed to step 328. At step 328, the selected adjustment value is applied to the benchmark value to form the final value.

The systems and methods provided by the present disclosure may be used to achieve one or more of the following, without limitation: facilitate trades occurring at or near NAV through exchange crossing platform 102; provide simplicity, transparency and case of understanding to exchange members 104/fund agent 108; leave no unfilled interest (e.g., process orders such that there is a buyer for every seller and a seller for every buyer); fit within existing technology and/or functionality; efficiently handle small size orders as well as large size orders; efficiently facilitate non-creation unit size primary creation and redemption activity with fund 110; apply to actively managed ETFs, index based ETFs, and other securities; and reduce the number of transactions (to be processed) at the fund.

The systems and methods of the present disclosure may also serve as a useful complement to secondary market trading at negotiated prices in AMETFs where a small investor may be uncertain of the desirability of the intraday prices. NOC crossing platform 102 may also make ETFs more attractive to certain customers, brokers, distribution platforms, etc.

The systems and methods of the present disclosure may be used by the following, without limitation: small investors concerned about intraday premiums or discounts, where immediacy of price is less of a concern than "fairness"; large investors with strategies that are benchmarked to fund the NAV, where NOC crossing platform 102 provides a way to guarantee order fill at a price within a reasonable spread to the NAV; distribution channels that prefer an option for NAV-based order filling; IRA and 401k plan providers, who may not currently be a large player in the ETF space, but by which NOC crossing platform 102 might make ETFs more feasible; and any other suitable participant.

The following is a discussion of some possible economic costs and risks of providing liquidity in NOC trading according to an embodiment of the present disclosure. In-kind creation and redemption fees (e.g., fees charged by the ETF for the physical exchange of ETF shares for a defined portfolio of securities) may depend on the number of securities in the creation unit portfolio and the number of ETFs per creation unit, and may be de minimis if there are a small number of securities in the portfolio. Creation and redemption fees associated with cash purchases and redemptions of ETF shares with the fund may be assessed to cover the cost to the fund of investing such cash or selling fund holdings to raise cash. Transaction costs for market purchases of ETFs and/or shares in creation and redemption portfolio deposits may include exchange fees and brokerage commissions, the bid-offer spread and potential market impact costs, among other costs. International and alternative assets may be more expensive. For in-kind transactions, risks also may include loss due to differences between the purchase (sale) prices of creation (redemption) deposit securities and the prices used in determining NAV. To the extent DMM fund agent 108 is able to transact at favorable prices in the deposit securities relative to those used in NAV determination, this risk may become a profit opportunity for some traders in some circumstances.

The following is a discussion of some possible economic benefits of providing liquidity in NOC trading according to an embodiment of the present disclosure. The ability for DMM fund agent 108 to transact with fund 110 in non-creation unit size aggregations may reduce or eliminate overnight risk associated with carrying positions in an ETF whose holdings are undisclosed. The cost may depend on whether such creation/redemption activity is in cash or in-kind. Investors may buy at prices that are slightly below the NAV and sell at prices that are slightly above the NAV because of the price adjustment process performed by crossing platform 102 described herein. This price differential may compensate DMM fund agent 108 sufficiently to cover a substantial portion of the costs described above. In addition, there may be other possible revenue sources available to DMM fund agent 108 to offset costs and incent liquidity provision, such as a share of transaction revenue earned by the exchange, or with appropriate legal and regulatory approval, fund or advisor compensation.

In an embodiment, the systems and methods of the present disclosure may minimize costs and/or maximize benefits to DMM fund agent 108. The risk of loss on close out trading positions may be minimized by fund 110 facilitating trades at prices to match the NAV and ensuring completely transparent pricing conventions for determining the value of shares and balancing cash component. The systems and methods described herein may maintain existing fund relationships with authorized participants (AP) as a creation and redemption mechanism. In other words, the systems and methods described herein may obviate the need to directly interact with retail or non-AP broker-dealers and the need for selling agreements.

Figure 4:
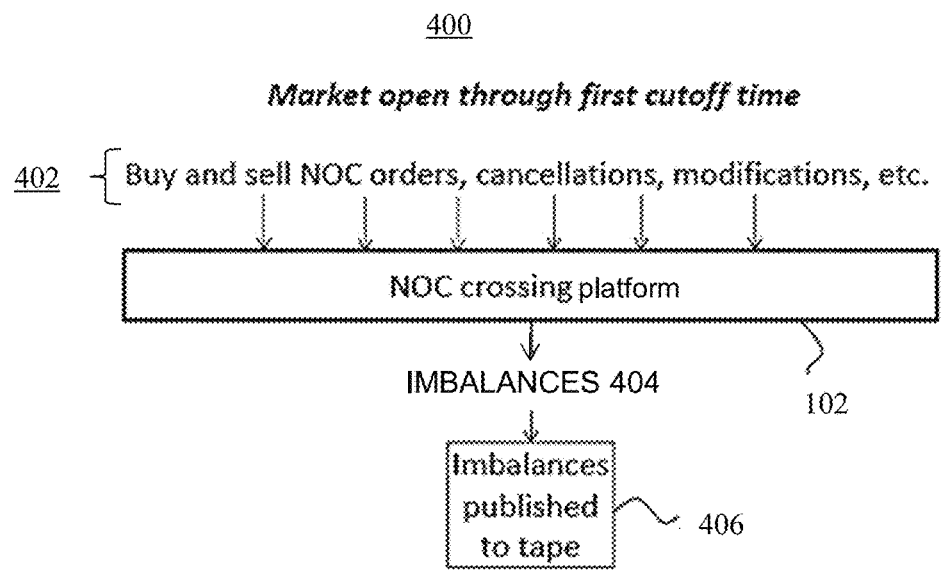
FIG. 4 is a flow diagram illustrating an example trading environment of the electronic trading system shown in FIG. 1 during a first time period from a market open time through a first cutoff time, according to an aspect of the present disclosure.
Figure 5:
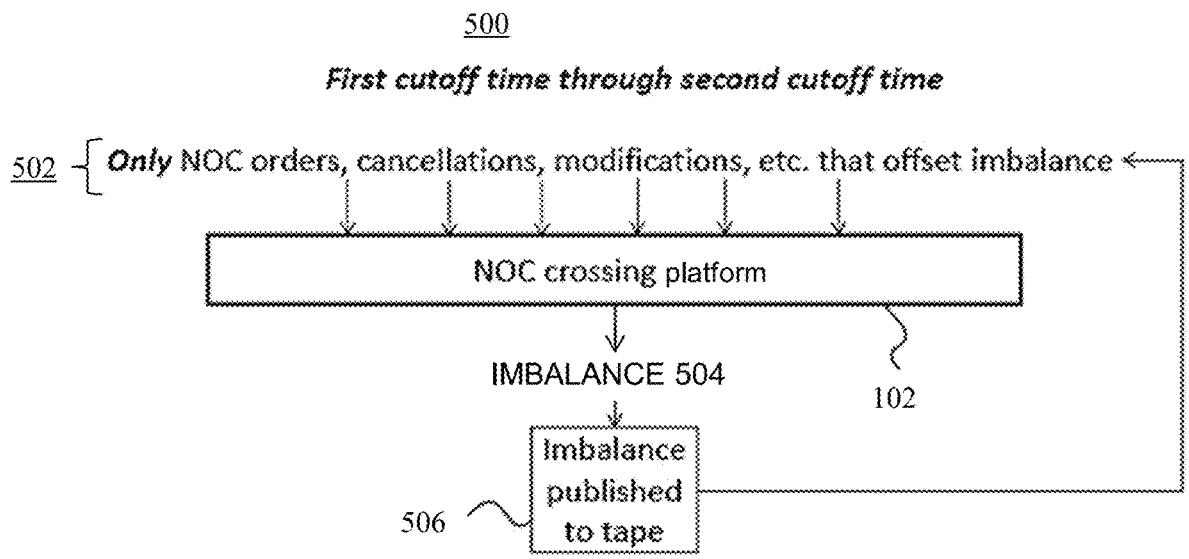
FIG. 5 is a flow diagram illustrating an example trading environment of the electronic trading system shown in FIG. 1 during a second time period from the first cutoff time through a second cutoff time, according to an aspect of the present disclosure.
Figure 6:
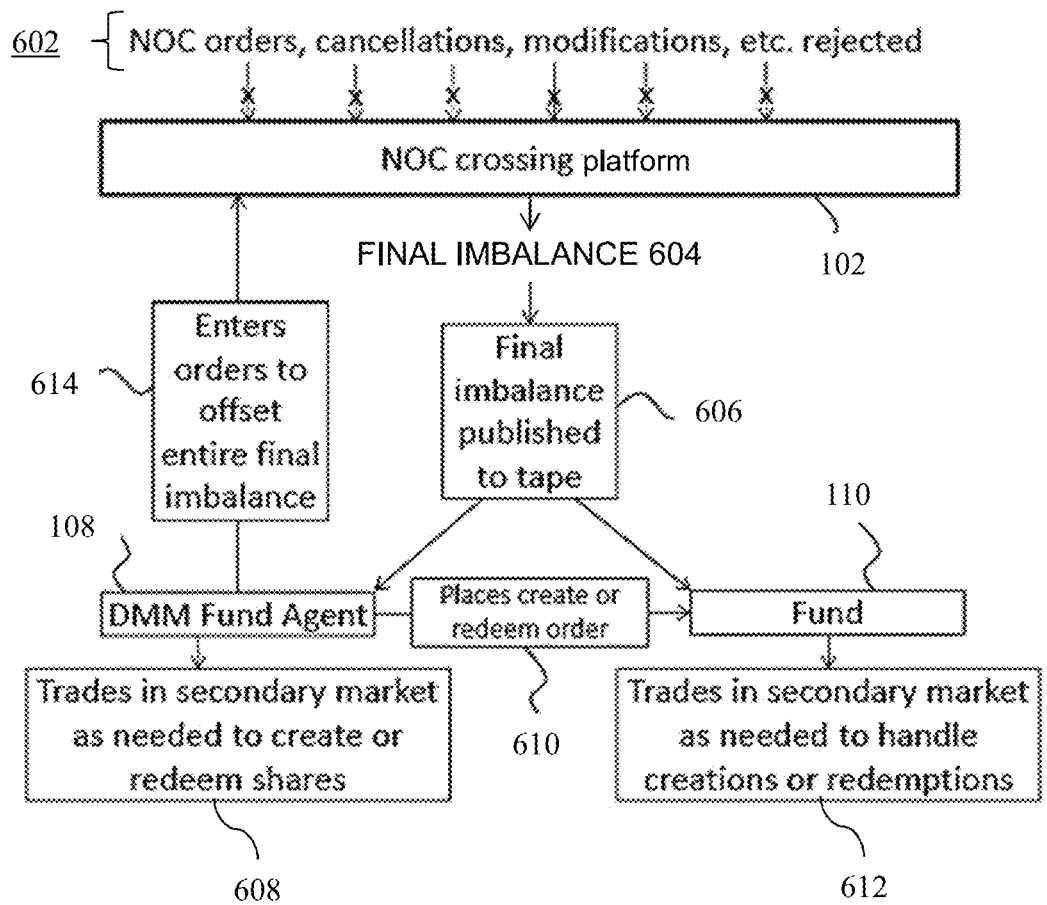
FIG. 6 is a flow diagram of illustrating an example trading environment of the electronic trading system shown in FIG. 1 during a third time period from after the second cutoff time until before a market close time, according to an aspect of the present disclosure.
Figure 7:
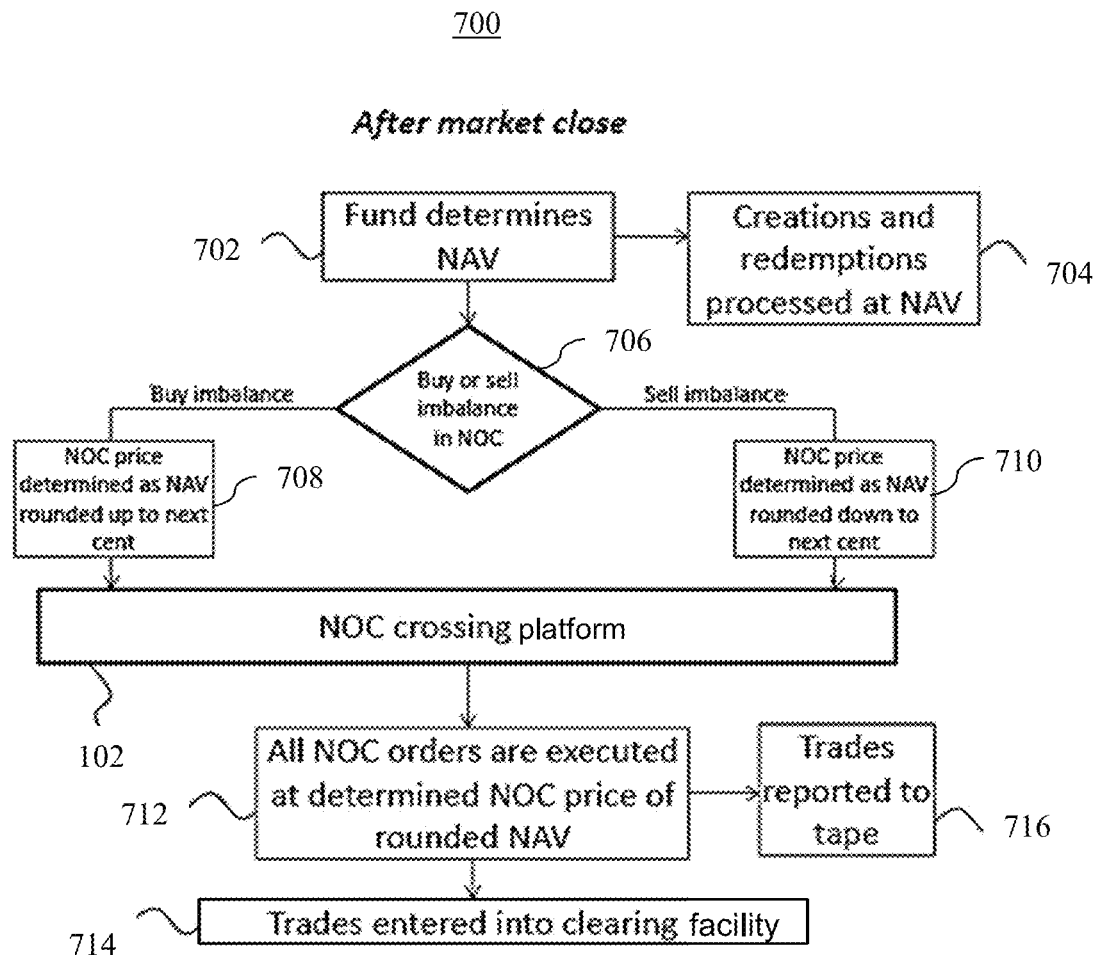
FIG. 7 is a flow diagram illustrating an example trading environment of the electronic trading system shown in FIG. 1 after the market close time, according to an aspect of the present disclosure.

Referring next to FIGS. 4-7, an example trading environment of electronic trading system 100 (FIG. 1) is described from a market open time until after a market close time. In particular, FIG. 4 is a flow diagram illustrating example trading environment 400 during a first time period from a market open time through a first cutoff time; FIG. 5 is a flow diagram illustrating example trading environment 500 during a second time period from the first cutoff time through a second cutoff time; FIG. 6 is a flow diagram of illustrating example trading environment 600 during a third time period from after the second cutoff time until before a market close time; and FIG. 7 is a flow diagram illustrating example trading environment 700 after the market close time.

Turning now to FIG. 4, example trading environment 400 from a market open time through a first cutoff time (i.e., the first time period described in steps 200-210 of FIG. 2A) is shown. Trading environment 400 includes one or more components of NOC crossing platform 102 to implement the following functions.

During the first time period when the market is open to the first cutoff time, NOC trade orders 402 (e.g., buy orders, sell orders, cancellations, and modifications) may be received and entered into NOC crossing platform 102. One or more order imbalances 404 (e.g., buy imbalance, sell imbalance) may be determined by NOC crossing platform 102 and communicated 406 to the market (e.g., published to tape) throughout the first time period and/or throughout the day.

Turning now to FIG. 5, example trading environment 500 from the first cutoff time through the second cutoff time (i.e., the second time period described in steps 216-226 of FIG. 2B) is shown. Trading environment 500 includes one or more components of NOC crossing platform 102 to implement the following functions.

Also, during the second time period from the first cutoff time through the second cutoff time, one or more order imbalances 504 (e.g., buy imbalance, sell imbalance) may be determined by NOC crossing platform 102 and communicated 506 to the market (e.g., published to tape) throughout the second time period and/or throughout the day.

During the time from the first cutoff time through a second cutoff time, only NOC orders 502 (e.g., buy and sell orders, cancellations, modifications) that offset the order imbalance 504 may be allowed to be entered into NOC crossing platform 102. Orders (not shown) that do not offset order imbalance 504 may be rejected and not entered into NOC crossing platform 102. For example, if order imbalance 504 is a buy imbalance, only sell orders or cancellations or modifications that offset the disproportionate number of buy orders may be accepted and entered. If order imbalance 504 is a sell imbalance, for example, only buy orders or cancellations or modifications that offset the disproportionate number of sell orders may be accepted and entered.

Turning now to FIG. 6, example trading environment 600 from the second cutoff time until before the market close time (i.e., the third time period described in steps 232-238 of FIG. 2B) is shown. Trading environment 600 includes one or more components of NOC crossing platform 102 to implement one or more of following functions.

During the third time period from after the second cutoff time to before the market close, NOC orders 602 (e.g., buy and sell orders, cancellations, modifications) may be rejected and not entered into NOC crossing platform 102. Final order imbalance 604 may be determined by NOC crossing platform 102 and communicated 606 to the market (e.g., published to tape).

Fund agent 108 (e.g., a designated market maker (DMM)) may receive an indication of final imbalance 604. Fund agent 108 may then trade 608 in secondary market 112 as needed to create and/or redeem shares to offset final imbalance 604, and form final trade order(s) 614. Fund agent 108 may also place creation and/or redemption orders 610 with fund 110, and fund 110 may trade 612 in secondary market 112 to handle the creation and/or redemption orders 610, and form final trade order(s) 614. NOC crossing platform 102 may enter final trade order(s) 614 received from fund agent 108 to offset the entire final imbalance 604.

Turning now to FIG. 7, example trading environment 700 after the market close is shown (i.e., corresponding to the time period described in steps 240-248 of FIG. 2C). Trading environment 700 includes one or more components of NOC crossing platform 102 to implement one or more of the following functions.

During the time after the market close, fund 110 may determine the NAV (at 702). Any creation and redemption orders entered into fund 110 may be processed by fund 110 at the NAV (at 704).

At 706, the final order imbalance (i.e., buy or sell imbalance) may be determined for the NOC trade orders to be executed. The buy or sell imbalance may be determined by comparing the final trade order(s) 614 (FIG. 6) with the final imbalance 604. The NOC trade orders to be executed may include NOC orders 402 (FIG. 4) entered into NOC crossing platform 102 before the first cutoff time (including modifications to those orders) and the (offsetting) NOC orders 502 (FIG. 5) entered into NOC crossing platform 102 between the first cutoff time and the second cutoff time (including non-rejected modifications to those orders).

If a final imbalance is a buy imbalance, the NOC transaction price may be determined, at 708, as the NAV adjusted up in favor of the seller. If the final imbalance is a sell imbalance, the NOC transaction price may be determined, at 710, as the NAV adjusted down in favor of the buyer. NOC crossing platform 102 may then execute, at 712, all NOC orders to be executed (i.e., orders 402 and orders 502) at the NOC transaction price (i.e., the adjusted NAV). The executed NOC trades 406 may then be entered, at 714, into a clearing facility, and may be published, at 716, to the market (e.g., reported to tape).

In an exemplary embodiment of the present disclosure, NOC orders 402 (FIG. 4) may be entered, modified and/or cancelled until a set time (i.e., the end of the first time period), for example 3:00 PM for purposes of this discussion. The order imbalance may be published to the market throughout the trading day. From the set time until a later set time (i.e., during the second time period), for example, from 3:00 PM until 3:30 PM, only NOC orders 502 (FIG. 5), cancellations and/or modifications that reduce the order imbalance may be accepted. All market participants may enter orders to offset the imbalance. At the later set time (i.e., 3:30 PM) (i.e., during the third time period), no more orders may be accepted, resting orders may not be modified or cancelled, and the final order imbalance 604 (FIG. 6) may be determined. Early cut-off times may allow a fund manager of fund 110 to affect trades to accommodate creation and redemption activity in fund 110, and may allow DMM fund agent 108 to place orders 610 for creation and redemption activity in fund 110. In some examples, in determining the NOC imbalance throughout the day (e.g., imbalance(s) 404, imbalance(s) 504), as well as final imbalance 604, resting orders on the limit order book to buy or sell the ETF at specified prices may not be included. For example, it may be difficult to determine whether such orders will be executable until after the NOC price is determined, and therefore will impact the final imbalance. In some examples, such interest may be included in the NOC execution, but this may entail additional risk for DMM fund agent 108.

After the later set time (i.e. 3:30 PM, during the third time period), DMM fund agent 108, who has agreed to be responsible for filling/offsetting NOC final order imbalance 604, may do so by interacting with fund 110. In a buy imbalance, DMM fund agent 108 may sell shares out of existing inventory or sell newly created shares. In a sell imbalance, DMM fund agent 108 may buy shares that add to the existing inventory or offset a short position, or buy and redeem shares to fund 110.

Creation and redemption unit size interactions with fund 110 may be handled through standard creation and redemption processes. Alternatively, creation orders may be handled for cash without a negative tax impact, but fund 110 may bear higher transaction costs. For non-creation and redemption unit sized interactions with fund 110, existing facilities of the securities depository and the clearing facility may be used to create or redeem positions and move such positions to and from an account of DMM fund agent 108 and fund 110. Using these services may result in a de minimis cost. For example, in one embodiment, only one DMM fund agent 108 may use these services each day, for cash or a very limited number of securities. Services such as deposit and withdrawal at custodian, participant terminal system, or settlement web, among others, may be incorporated into NOC crossing platform 110. If the creation is in-kind, a simple calculation to determine appropriate deposit quantities may be used.

Fund 110 may then determine the NAV by a certain time (i.e., after the third time period), for example by 6:00 PM. Once the NAV is determined, the buyers and sellers may be paired off by NOC crossing platform 102 and trades may occur at the NOC price. The NOC price may be reported during an after-hours session, which can close at the end of the day, for example at 8:00 PM. The NOC price may be determined to a minimum tick size (e.g., one cent) as follows: if DMM fund agent 108 bought shares to offset a sell imbalance, the NAV may be adjusted down; if DMM fund agent 108 sold shares to offset a buy imbalance, the NAV may be adjusted up; and if there is no order imbalance, the NAV may be rounded to the nearest cent. If necessary to ensure sufficient incentive for liquidity provision, the NAV adjustment may include a cost of DMM fund agent 108 associated with the creation/redemption and trading activity associated with providing such liquidity. The trades may then clear and settle that night at the NOC price.

Systems and methods of the present disclosure include and/or are implemented by one or more computers including hardware and/or software components. For purposes of this disclosure, a computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

FIG. 8 illustrates a functional block diagram of a machine in the example form of computer system 800 within which a set of instructions for causing the machine to perform any one or more of the methodologies discussed herein, may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, crossing platform 102 (FIG. 1) may be implemented by the example machine shown in FIG. 8 (or a combination of two or more of such machines).

Example computer system 800 may include processing device 802, memory 804, data storage device 810 and communication interface 812, which may communicate with each other via data and control bus 818. In some examples, computer system 800 may also include display device 814 and/or user interface 816.

Processing device 802 may include, without being limited to, a microprocessor, a central processing unit, an application specific integrated circuit (ASIC), a field programmable gate array (FPGA), a digital signal processor (DSP) and/or a network processor. Processing device 802 may be configured to execute processing logic 804 for performing the operations described herein. In general, processing device 802 may include any suitable special-purpose processing device or a general-purpose processing device specially programmed with processing logic 804 to perform the operations described herein.

Memory 806 may include, for example, without being limited to, at least one of a read-only memory (ROM), a random access memory (RAM), a flash memory, a dynamic RAM (DRAM) and a static RAM (SRAM), storing computer-readable instructions 808 executable by processing device 802. In general, memory 806 may include any suitable non-transitory computer readable storage medium storing computer-readable instructions 808 executable by processing device 802 for performing the operations described herein. Although one memory device 808 is illustrated in FIG. 8, in some examples, computer system 800 may include two or more memory devices (e.g., dynamic memory and static memory).

Computer system 800 may include communication interface device 812, for direct communication with other computers (including wired and/or wireless communication) and/or for communication with network 114 (FIG. 1). In some examples, computer system 800 may include display device 814 (e.g., a liquid crystal display (LCD)). In some examples, computer system 800 may include user interface 816 (e.g., an alphanumeric input device, a cursor control device, a loudspeaker, etc.).

In some examples, computer system 800 may include data storage device 810 storing instructions (e.g., software) for performing any one or more of the functions described herein. Data storage device 810 may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

For purposes of this disclosure the term "product" or "financial product" should be broadly construed to comprise any type of financial instrument including, without limitation, commodities, derivatives, shares, bonds, and currencies. Derivatives, for example, should also be broadly construed to comprise (without limitation) any type of options, caps, floors, collars, structured debt obligations and deposits, swaps, futures, forwards, and various combinations thereof.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

The invention claimed is:

1. A non-transitory computer-readable medium storing computer-readable instructions that, when executed by one or more processors, cause the one or more processors to perform the functions comprising:
    receiving, over a communication network, order data during a first period;
    transmitting, over the communication network, to one or more computing devices, an indication of an order imbalance among the order data remaining after the first period;
    initiating a second period, and during the second period:
        accepting, over the communication network, additional order data from among the one or more computing devices that contributes to offsetting the order imbalance,
        monitoring changes in the order imbalance, over the second period, in response to the additional order data,
        transmitting, over the communication network, to the one or more computing devices, an indication of the monitored changes over the second period, and
        identifying a remaining imbalance after the second period responsive to applying the additional order data to the order data to at least partially offset the order imbalance;
    initiating a third period, and during the third period:
        accepting, over the communication network, only further order data that, collectively, fully offsets the remaining imbalance, thereby creating a fully balanced order data set; and
    generating and processing pairable trade orders from the fully balanced order data set.

2. The non-transitory computer-readable medium of claim 1, wherein the order data defines a combination of trade orders, order modifications, and order cancelations.

3. The non-transitory computer-readable medium of claim 1, wherein the functions further comprise:
    rejecting, during the third period, a portion of the further order data that does not contribute to fully offsetting the remaining imbalance.

4. The non-transitory computer-readable medium of claim 3, wherein the portion of the further order data includes any final trade orders, final modifications and final cancelations that do not contribute to fully offsetting the remaining imbalance.

5. The non-transitory computer-readable medium of claim 1, wherein, responsive to the accepting of only further order data that fully offsets the remaining imbalance, only the pairable trade orders remain in the fully balanced order data set after the third period.

6. The non-transitory computer-readable medium of claim 1, wherein the one or more computing devices comprise one or more external market participant computers and a fund agent computing device, wherein the functions further comprise, during the third period:
    rejecting trade orders received from the one or more external market participant computers, and
    only receiving the further order data from the fund agent computing device.

7. The non-transitory computer-readable medium of claim 1, wherein the order data defines one or more trade orders that correspond to at least one of an actively managed exchange-traded fund (ETF), an index-based ETF, a passively managed ETF and a security associated with a benchmark value.

8. The non-transitory computer-readable medium of claim 1, wherein the indication of the order imbalance comprises at least one of an extent of the order imbalance among the order data and an existence of the order imbalance.

9. The non-transitory computer-readable medium of claim 1, wherein the functions further comprise:
    identifying the order imbalance among the order data during the first period; and
    transmitting at least one of an existence of the order imbalance and an extent of the order imbalance during the first period to the one or more computing devices.

10. The non-transitory computer-readable medium of claim 1, wherein the functions further comprise:
    rejecting any remaining data received during the second period that does not contribute to offsetting the order imbalance.

11. The non-transitory computer-readable medium of claim 1, wherein the functions further comprise:
    transmitting, over the communication network, prior to the third period, the remaining imbalance to the one or more computing devices; and receiving, over the communication network, the further order data from among the one or more computing devices responsive to the transmitted remaining imbalance.

12. The non-transitory computer-readable medium of claim 11, wherein the one or more computing devices comprise at least one fund agent computing device, wherein the functions further comprise:

receiving a benchmark value from the at least one fund agent computing device over the communication network;

determining an adjustment value;

converting the benchmark value to a final value by applying the adjustment value to the benchmark value; and executing paired buy and sell orders from among data defining the pairable trade orders at the final value, such that the pairable trade orders track the benchmark value.

13. The non-transitory computer-readable medium of claim 12, wherein the adjustment value is determined to:

decrease the benchmark value when the further order data defines at least one buy order and the remaining imbalance is a sell imbalance, and increase the benchmark value when the further order data defines at least one sell order and the remaining imbalance is a buy imbalance.

14. The non-transitory computer-readable medium of claim 12, wherein the benchmark value includes a net asset value (NAV).

15. The non-transitory computer-readable medium of claim 12, wherein the at least one fund agent computing device is configured to generate, as part of the further order data, one or more final trade orders responsive to trading with a secondary market, by at least one of creation activity or redemption activity, to completely offset the remaining imbalance.

16. The non-transitory computer-readable medium of claim 15, wherein the at least one of the creation activity or the redemption activity includes creation unit size activity or non-creation unit size activity.

17. The non-transitory computer-readable medium of claim 1, wherein the additional order data comprises a combination of offsetting trade orders, offsetting order modifications, and offsetting order cancelations.

18. The non-transitory computer-readable medium of claim 1, wherein the further order data comprises a combination of final trade orders, final order modifications and final order cancelations.

* * * * *